United States Patent [19]

McKenzie

[11] 4,044,791
[45] Aug. 30, 1977

[54] VALVE ASSEMBLY

[75] Inventor: Roland W. McKenzie, Culpeper, Va.

[73] Assignee: City Tank Corporation, Culpeper, Va.

[21] Appl. No.: 639,600

[22] Filed: Dec. 10, 1975

[51] Int. Cl.² ........................................ F16K 17/18
[52] U.S. Cl. .............................. 137/493.9; 137/513.3
[58] Field of Search ............ 137/493, 493.9, 493.7, 137/493.8, 513.3; 138/46, 45, 43

[56] References Cited

U.S. PATENT DOCUMENTS

| 624,624 | 5/1899 | Casey | 138/46 X |
| 1,724,881 | 8/1929 | Lund | 138/46 X |
| 2,033,839 | 3/1936 | Lawson | 137/493 |
| 2,633,148 | 3/1953 | Kelly | 137/493 X |
| 2,690,762 | 10/1954 | Adams | 137/493.7 X |
| 3,092,137 | 6/1963 | Van Eldik Thieme et al. | 137/493 |

Primary Examiner—Robert G. Nilson
Attorney, Agent, or Firm—Mason, Fenwick & Lawrence

[57] ABSTRACT

A valve assembly comprising a body having a fluid passageway therethrough providing first and second ports, a floating valve seat and an engageable poppet disposed in the fluid passageway of the body between the ports thereof, means disposed on the body for yieldably biasing the valve seat into engagement with the poppet, means disposed on the body for yieldably biasing the poppet into engagement with the valve seat, abutment means disposed on the body engageable by the floating valve seat and poppet for restricting the movement of each of the floating valve seat and poppet toward the other thereof under the influence of the biasing means, the floating valve seat having a fluid passageway therethrough intercommunicating the first port and the poppet when the valve seat and poppet are disposed in engagement, the poppet having a primary fluid passageway therethrough intercommunicating the fluid passageway of the floating valve seat and the second port of the body when the valve seat and poppet are disposed in engagement, and the poppet having at least one secondary fluid passageway intercommunicating the floating valve seat and the second port of the body.

16 Claims, 3 Drawing Figures

VALVE ASSEMBLY

The present invention relates to a valve assembly and more particularly to a valve assembly adapted to accommodate fluid flow in forward and reverse directions at different flow rates responsive to line pressure.

In control systems for fluid actuated mechanisms such as hydraulically actuated packer mechanisms for refuse collection vehicles and the like, it often is desirable to provide valves which are adapted to accommodate the flow of fluid in forward and reverse directions at different flow rates responsive to line pressure to provide a predetermined cycling of the mechanism. It has been found, however, that most valves of such type in the prior art are not entirely effective and reliable in the performance of such functions.

Accordingly, it is the principal object of the present invention to provide an improved valve assembly.

Another object of the present invention is to provide an improved valve assembly which is adapted to accommodate the flow of fluid in forward and reverse directions at different flow rates responsive to line pressure.

A further object of the present invention is to provide a novel valve assembly suitable for use in a control system for a fluid actuated mechanism.

A still further object of the present invention is to provide a novel valve assembly adapted to accommodate the flow of fluid in forward and reverse directions at different flow rates responsive to line pressure which is suitable for use in the control system for a fluid actuated packer mechanism of a refuse collection vehicle.

Another object of the present invention is to provide a novel valve assembly which is highly responsive to line pressures for effecting changes in flow rates therethrough in both forward and reverse directions.

A further object of the present invention is to provide a novel valve assembly which is comparatively simple in design, relatively inexpensive to manufacture and highly effective and reliable in performance.

Other objects and advantages of the present invention will become more pertinent to those persons having ordinary skill in the art to which the present invention pertains, from the following description taken in conjunction with the accompanying drawings wherein.

Figure 2:
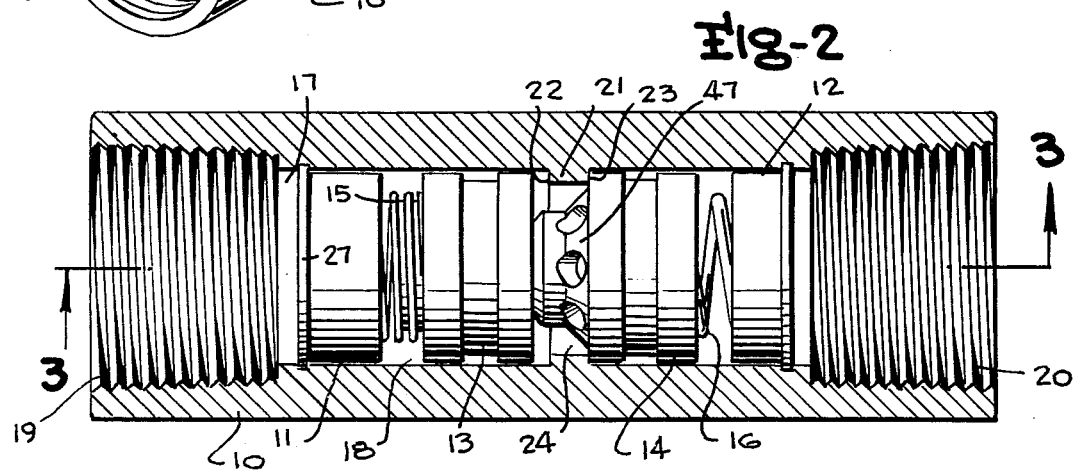
FIG. 2 is a side elevational view of the embodiment shown in FIG. 1, illustrating the components thereof in the assembled condition and the housing or body portion thereof in vertical crosssection.
Figure 3:
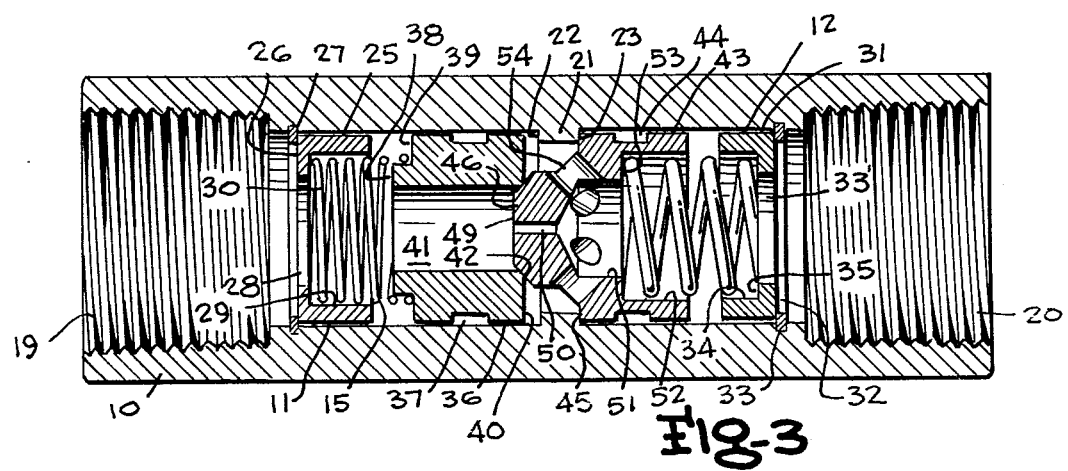
FIG. 3 is a vertical cross-sectional view of the embodiment illustrated in FIGS. 1 and 2.

Referring to the drawing, it will be seen that the embodiment illustrated therein generally includes a housing or body 10, a pair of retainers 11 and 12 disposed within housing 10, a first valve element or floating valve seat 13 and a second valve element or poppet 14 disposed within the housing between retainers 11 and 12, a compression spring 15 interposed between retainer 11 and floating valve seat 13 and a compression spring 16 interposed between retainer 12 and poppet 14. Housing or body 10 substantially has a tubular configuration providing an inner cylindrical wall 17 defining a fluid passageway 18 intercommunicating a pair of ports 19 and 20. The end portions of inner cylindrical wall 17 are threaded as illustrated in FIGS. 2 and 3 to permit the valve assembly to be threaded to fluid lines of a control system or the like. Inner cylindrical wall 17 further is provided with an annular flange 21 disposed between the ends thereof which provides a pair of annular abutment surfaces 22 and 23 and a restricted section 24 in passageway 18.

Retainer 11 has an annular configuration including an outer cylindrical surface 25 engaging inner housing wall 17, an annular end surface 26 engaging a retainer ring 27 received in an annular recess in inner housing wall 17 and an axial passageway 28 having an enlarged section 29 providing an annular surface 30 which is engaged by an end of compression spring 15. Similarly, retainer 12 has an annular configuration including an annular surface 31 disposed substantially in engagement with inner housing wall 17, an annular end surface 32 engaging a retainer ring 33 seated in an annular recess in inner housing wall 17 and an axially disposed passageway 33' having an enlarged section 34 defining an annular seating surface 35 engaged by an end of compression spring 16.

Floating valve seat 13 is provided with a cylindrical surface 36, being recessed as at 37, which is disposed in sealing engagement with inner housing wall 17. Preferably, an o-ring is provided between the floating valve seat and inner housing wall 17 to provide a fluid tight seal therebetween. The valve seat further is provided with an end surface 38, recessed at the outer periphery thereof to provide an annular seating surface 39 engaged by an end of compression spring 15, an end surface 40 biased into engagement with annular abutment surface 22 by means of compression spring 15, and an axially disposed main passageway 41 providing at an inner end thereof a frusto-conically configured seating surface 42. As best illustrated in FIG. 3, it will be noted that compression spring 15 is seated on retainer 11 and exerts a force on floating valve seat 13 to urge the valve seat in engagement with annular abutment surface 22.

Figure 1:
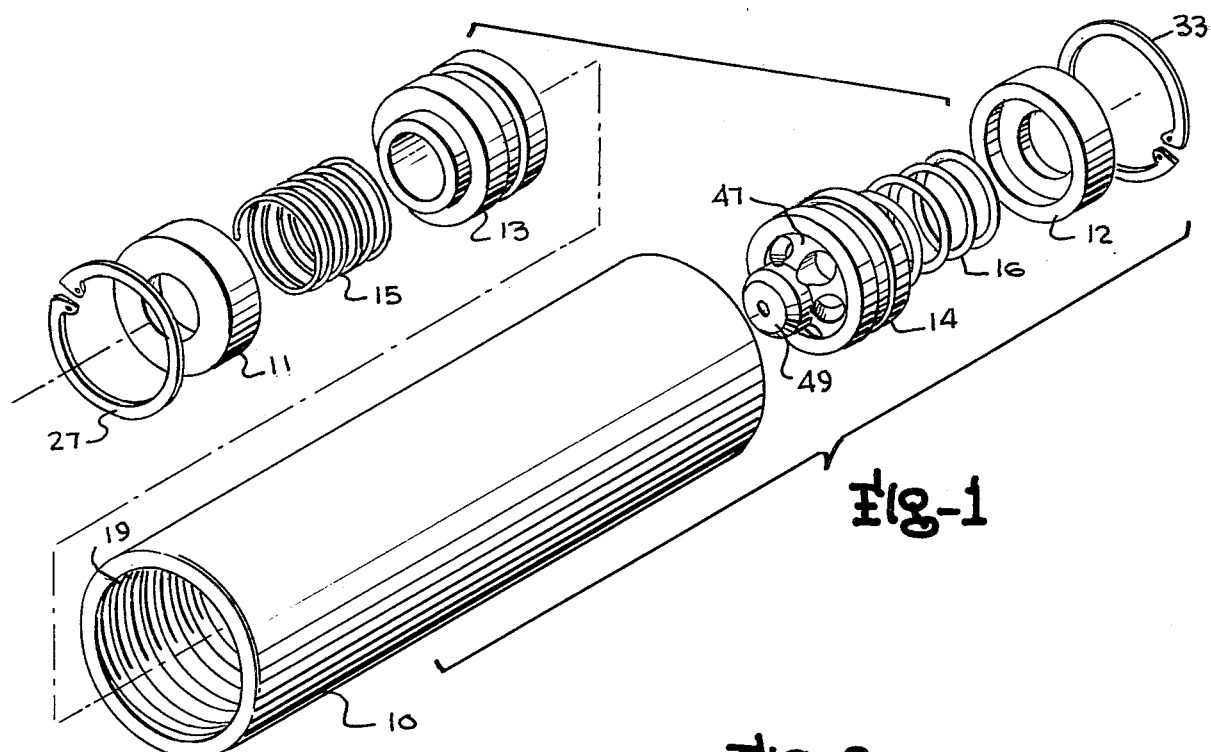
FIG. 1 is a perspective view of an embodiment of the invention, illustrating the components thereof in exploded relation.

Poppet 14 also is provided with a cylindrical surface 43, having a recess 44, which is disposed in sealing engagement with inner cylindrical wall 17. Here, also, it is preferred that a fluid tight seal between the poppet and the inner wall of the housing be provided with an o-ring. Poppet 14 further is provided with an annular end surface 45 and a protruding portion 46 which projects through restricted passageway section 24 when annular end surface 45 engages annular abutment surface 23 of abutment flange 21. Protruding portion 46 includes an inner, frusto-conically shaped surface 47, as best illustrated in FIGS. 1 and 2, a frusto-conically configured seating surface 48 adapted to engage similarly configured surface 42 of the floating valve seat, and an end surface 49 which is adapted to be disposed within fluid passageway 41 of the floating valve seat when valve seating surface 48 of the poppet engages seating surface 42 of the floating valve seat.

Poppet 14 further is provided with an axially disposed, primary passageway 50 provided with a first enlarged section 51 and a second enlarged section 52 defining an annular surface 53 engaged by an end of compression spring 16. As best illustrated in FIG. 3, poppet 14 also is provided with a plurality of circumferentially spaced secondary passageways 54 intercommunicating ports provided on frusto-conically shaped surface 47 of the poppet and enlarged section 51 of the axial passageway therein. Consequently, fluid pressure in port 20 is communicated to the volumetric space between facing surfaces 40 and 45 so as to act on surface 40 against the force of spring 15 to urge element 13 toward port 19.

From the construction of the assembly as described, it will be noted that compression springs 15 and 16 seated on retainers 11 and 12 will urge the floating valve seat and poppet into mutual engagement and that the travel of either of the floating valve seat or poppet in the direction of the other thereof will be restricted by annular flange 21.

In the operation of the assembly, whenever fluid is flowing through the assembly in a forward direction, i.e., from port 19 to port 20, below a predetermined pressure, the fluid will be caused to flow through port 19, retainer 11, passageway 41 of the floating valve seat, passageway 50 of the poppet, retainer 12 and out through port 20. Under such conditions, because of the restricted size of primary passageway 50 in poppet 14, the fluid will flow at a comparatively low rate. However, whenever the line pressure increases beyond the predetermined value, the fluid bearing against end surface 49 of the poppet eventually will overcome the force exerted on the poppet by compression spring 16 to cause the poppet to move to the right toward port 20. Initially, as poppet 14 moves to the right, it will remain seated on the floating valve seat due to the pressure exerted on the floating valve seat by compression spring 15. As the poppet continues to move to the right, however, end surface 40 of the floating valve seat eventually will engage abutment surface 22 thus preventing the floating valve seat to continue to move to the right. Under such circumstances, the force of the fluid, continuing to act on end surface 49 of the poppet, will unseat the poppet from the floating valve seat thus causing a displacement between the floating valve seat and poppet permitting fluid to flow past the protruding portion of the poppet and through secondary passageways 54 thus increasing the flow rate of the fluid as the line pressure remains at or above the aforementioned predetermined value.

With the components of the assembly disposed in positions as illustrated in FIGS. 2 an 3 and with fluid flowing through the assembly in a reverse direction, under a pressure below a predetermined value, the fluid will be caused to flow through retainer 12, axial passageway 50 of poppet 14, passageway 41 of the floating valve seat, retainer 11 and out through port 19, at a first flow rate. Under such conditions, fluid will be caused to flow through secondary passageways 54 and bear on end surface 40 of the floating valve seat but the floating valve seat will be caused to continue to engage the protruding portion of the poppet by compression spring 15. However, whenever the line pressure increases above the predetermined value, sufficient pressure is brought to bear against end surface 40 of the floating valve seat to displace the floating valve seat relative to the poppet thus permitting fluid to flow at a higher flow rate through both primary passageway 50 and secondary passageways 54 past the gap provided by the displacement of the floating valve seat and poppet into passageway 41 of the floating valve seat. It thus will be seen that the valve assembly will be operated to accommodate the flow of fluid through forward and reverse directions at different flow rates responsive to predetermined line pressures.

In the embodiment described, compression spring 16 is depicted as larger than compression spring 15 thus functioning to exert a greater force on floating valve seat 13 and poppet 14 than compression spring 15. It is within the scope of this invention, however, that either of such springs have a higher force exerting property than the other or that the force exerting properties of the two springs be equal.

The embodiment as described can be assembled simply by initially inserting the floating valve seat through port 19 so that it becomes seated on annular flange 21, inserting compression spring 15 in the housing so that it becomes seated on annular end surface 39 of the floating valve seat, inserting retainer 11 into the housing so that annular surface 30 is seated on the end of the spring, urging the retainer against the spring to compress it and inserting the retainer ring in the groove provided in the inner walls of the housing. When the spring is released, it will urge retainer 11 against the retainer ring thus completing the assembly of one end of the device. Poppet 14 is then inserted in the opposite end of the housing so that the protruding portion thereof is seated on seating surface 42 of the floating valve seat. Compression spring 12 is then inserted in the housing and seated on annular surface 53, retainer 12 is inserted in the housing so that annular surface 35 engages the end of the compression spring, the retainer is compressed against the compression spring to move the retainer past the annular retainer ring receiving groove and held in position while retainer ring 33 is inserted in the groove. The device is then fully assembled, ready to be connected to conventional fluid lines of a desired control system.

From the foregoing detailed description, it will be evident that there are a number of changes, adaptations and modifications of the present invention which come within the province of those persons skilled in the art to which such invention pertains. However, it is intended that all such variations not departing from the spirit of the invention be considered as within the scope thereof as limited solely by the appended claims.

I claim:

1. A flow control valve assembly for providing fluid flow at varying rates in accordance with the input pressure of fluid to the valve assembly comprising a body having a fluid passageway therethrough including first and second ports, engageable first and second valve elements movably disposed in said fluid passageway between said ports, means disposed on said body for yieldably biasing said first valve element into engagement with said second valve element, means disposed on said body for yieldably biasing said second valve element into engagement with said first valve element, abutment means disposed on said body engageable by said first and second valve elements for restricting the movement of each of said valve elements toward the other thereof under the influence of said biasing means, said first valve element having a main fluid passageway therethrough intercommunicating said first port and said second valve element when said valve elements are disposed in engagement, said second valve element having a primary fluid passageway therethrough intercommunicating said main fluid passageway of said first valve element and said second port when said valve elements are disposed in engagement, and said second valve element having at least one secondary fluid passageway intercommunicating said first valve element and said second port whereby liquid flow at a relatively high rate of flow occurs through said primary fluid passageway and said secondary fluid passageway and said main fluid passageway when the input pressure is above a predetermined value with flow being restricted at a lower rate to the primary fluid passageway and the main fluid passageway when the input pressure is below a predetermined value.

2. A valve assembly according to claim 1 wherein said primary fluid passageway is disposed along a longitudinal center line of said second valve element and including a plurality of secondary fluid passageways spaced circumferentially relative to said center line.

3. A valve assembly according to claim 2 wherein said secondary fluid passageways are disposed at acute angles relative to said centerline.

4. A valve assembly according to claim 1 wherein the fluid passageway of said first valve element provides an annular valve seat engageable by an annular seating surface of said second valve element.

5. A valve assembly according to claim 1 wherein said abutment means comprises an annular flange disposed on said body in said main fluid passgeway between said ports, and said second valve element includes a portion protruding through said annular flange, into engagement with said first valve element.

6. A valve assembly according to claim 5 wherein said primary fluid passageway is disposed along a longitudinal center line of said second valve element and includes a plurality of secondary fluid passageways spaced circumferentially relative to said centerline.

7. A valve assembly according to claim 6 wherein said secondary fluid passageways are disposed at acute angles relative to said center line.

8. A valve assembly according to claim 5 wherein the fluid passageway of said first valve element provides an annular valve seat engageable by an annular seating surface formed on the protruding portion of said second valve element.

9. A valve assembly according to claim 5 wherein said biasing means comprise compression springs.

10. A valve assembly according to claim 9 wherein said compression spring disposed between said body and said second valve element exerts a force that is different from the force exerted by the compression spring disposed between said valve body and said first valve element.

11. A flow control valve for providing liquid flow at different flow rates in two alternative flow directions through the valve under the control of the inflow pressure to the valve, said valve comprising a body having a fluid passageway therethrough, first and second ports provided respectively at opposite ends of said fluid passageway, first and second valve elements mounted for linear movement in said fluid passageway between said ports being capable of engagement along mutually abutting surfaces, said first and second valve elements additionally including facing spaced surfaces between which a volumetric space between the valve elements is defined, first biasing means mounted in said body for yieldably biasing said first valve element toward said second valve element and said second port, second biasing means mounted in said body for yieldably biasing said second valve element toward said first valve element and said first port so that said first and second valve elements are normally engaged at their mutually abutting surfaces, movement limiting means disposed in said body for limiting the extent of movement of said first and second valve elements respectively toward said second and first ports under the influence of said biasing means, said first valve element having a main fluid passageway therethrough providing communication between said first port and said second valve element so that fluid pressure in said main fluid passage urges said second valve element toward said second port against the action of said biasing means, said main fluid passageway and said volumetric space being blocked from communication with each other when said valve elements are disposed in engagement with each other, said second valve element including a primary fluid passageway therethrough providing communication between said main fluid passageway and said second port when said valve elements are disposed in engagement with each other, flow between said ports in either direction being limited to a relatively low rate of flow through said main fluid passageway and said primary fluid passageway when said valve elements are engaged and the fluid input pressure is below a predetermined value, said second valve element including secondary fluid passageway means providing communication between the volumetric space between said valve elements and said second port, said second biasing means exerting a predetermined force so that fluid pressure in said first port above a predetermined value is effective to overcome said second biasing means to move said second valve element from contact with said first valve element to permit flow from said first port to said second port at a relatively high flow rate through said main fluid passageway, said volumetric space, said primary fluid passageway and said secondary fluid passageway to said second port, said first biasing means exerting a predetermined force so that pressure in said second port above a predetermined pressure is effective through said secondary fluid passageway means to said volumetric space to overcome said first biasing means to move said first valve element from contact with said second valve element to permit flow at a relatively high rate from said second port through said primary fluid passageway, said second fluid passageway means, said volumetric space between said valve element and said main fluid passageway to said first port.

12. A valve assembly according to claim 11 wherein the cross-sectional flow area of said primary fluid passageway is substantially less than that of said main fluid passageway.

13. The valve assembly of claim 12 wherein said secondary fluid passageway means comprises a plurality of secondary fluid passageways having a cross-sectional flow area substantially in excess of that of said primary fluid passageway.

14. A valve assembly according to claim 11 wherein one of said biasing means exerts a greater biasing force than the other of said biasing means.

15. A valve assembly according to claim 14 wherein the cross-sectional flow area of said primary fluid passageway is substantially less than that of said main fluid passageway.

16. The valve assembly of claim 15 wherein said secondary fluid passageway means comprises a plurality of secondary fluid passageways having a cross-sectional flow area substantially in excess of that of said primary fluid passageway.

* * * * *